Oct. 8, 1968 R. SMOREN 3,404,923
NON-SKID BRAKING SYSTEM FOR AUTOMOBILES
Filed June 24, 1966
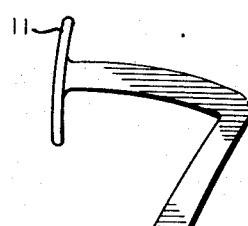
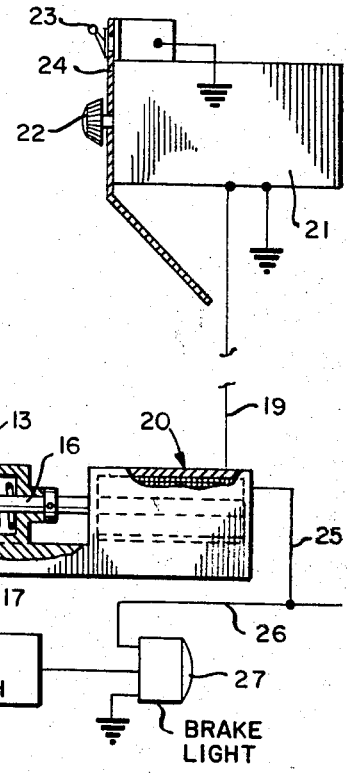
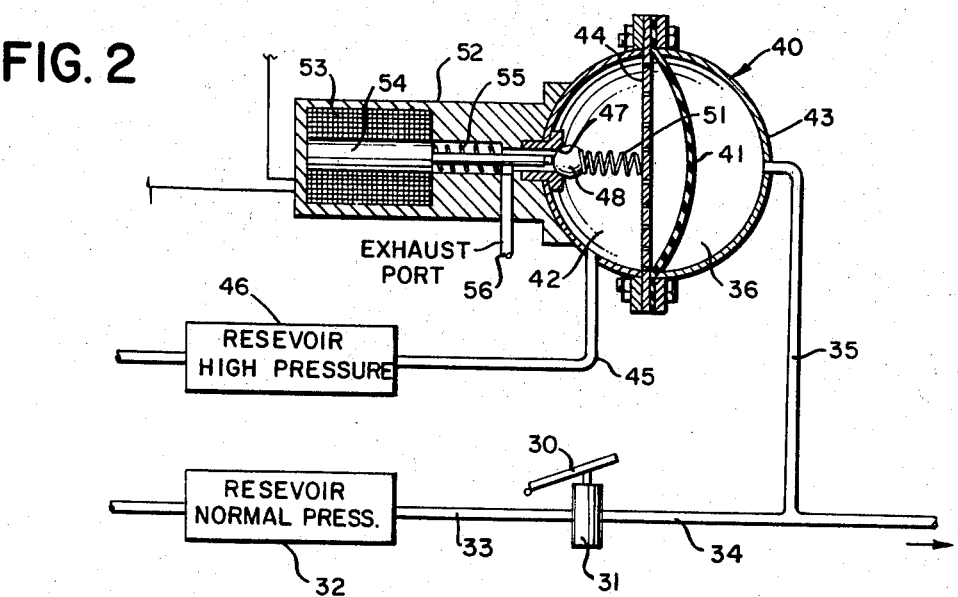
INVENTOR
ROBERT SMOREN
BY
ATTORNEY United States Patent Office 3,404,923
Patented Oct. 8, 1968

3,404,923
NON-SKID BRAKING SYSTEM FOR AUTOMOBILES
Robert Smoren, 61—28 214th St.,
Bayside, N.Y. 11364
Filed June 24, 1966, Ser. No. 560,200
4 Claims. (Cl. 303—61)

ABSTRACT OF THE DISCLOSURE

Anti-skid control for fluid-actuated braking systems including a master cylinder actuated by the brake pedal, a second cylinder connected to the master cylinder and having a solenoid actuated piston energized by a timer for varying the fluid pressure in timed pulses. The solenoid circuit includes a switch responsive to movement of the brake pedal and an additional deenergizing switch, the arrangement being such that when the brake pedal is depressed, the braking pressure is periodically reduced. In an air brake system, a control valve having high and low pressure chambers separated by a flexible diaphragm is connected to be actuated periodically for reducing the fluid pressure applied to the brake line.

---

This invention relates to braking systems for automobiles and has for an object to provide a system having non-skid characteristics.

Various specific objects and advantages will be apparent as the nature of the invention is more fully disclosed.

The present system is particularly applicable to a fluid operated brake system wherein fluid pressure is controlled by the brake pedal of the vehicle and is transmitted to actuating cylinders at the wheels which are connected to apply pressure to the brake drums.

In a system of this type excessive pressure, particularly on a wet or slippery surface, may cause the wheels to lock and produce a skid or hydroplane. The present invention provides means to increase and reduce the fluid pressure repeatedly and rapidly in a cycle so that the wheels cannot remain locked but are alternately braked and released. The timing of the cycle may be altered in accordance with road conditions.

The nature of the invention will be better understood from the following description, taken in connection with the accompanying drawing, in which certain specific embodiments have been set forth for purposes of illustration.

In the drawing:

FIGURE 1 is a diagrammatic representation of a hydraulic braking system embodying the invention, and FIG. 2 is a diagrammatic view illustrating an air brake system embodying the invention.

Referring to the drawing more in detail the invention is shown as applied to a hydraulic braking system comprising a master brake cylinder 10 adapted to be actuated by a brake pedal 11 and connected by lines 12 to actuating cylinders, not shown, which are adapted to control the brake shoes on the various wheels of the vehicle. A hydraulic cylinder 13 having an actuating piston 14 is connected by a line 15 to the master cylinder 10. The piston 14 is connected by a rod 16 to a solenoid 20 which is adapted, when energized, to cause the piston 14 to exert pressure on the hydraulic fluid in the cylinder 13 and, when de-energized, to reduce the pressure on the fluid. A spring 17 is disposed within the cylinder 13 to cause the piston 14 to maintain a minimum pressure on the hydraulic fluid. The solenoid 20 is connected by a line 19 to a timed relay 21 which is adapted to energize and de-energize the solenoid 20, repeatedly, in a timed cycle the frequency of which can be adjusted by a control 22 which may be mounted on the instrument panel 24 of the vehicle. The circuit connection to the solenoid also includes an on-and-off switch 23 mounted on the instrument panel 24 and adapted to be actuated manually or in conjunction with the windshield wiper control so that the solenoid is brought into operation manually or automatically when the windshield wiper is turned on. The on-and-off switch 23 may include control means such as a rheostat to control the maximum pressure which is exerted on the piston 14 by the solenoid 20.

The solenoid 20 is also connected by a line 25 to the stop light line 26 which is connected to a stop light 27 and to a control switch 28 which is actuated by the brake pedal 11. Hence the solenoid 20 is energized whenever the stop light 27 is energized due to actuation of the brake pedal.

The cycle of the timer 21 may be of the order of several times a second depending upon road conditions and speed and upon the mechanical lag of the brake system.

The arrangement is such that when the solenoid and timing relay are operating, a fluctuating pressure is generated and superimposed on the pressure generated by the brake pedal. Even if the higher peaks of this pressure should be sufficient to cause the wheels to lock, the pressure is reduced by the pulsing device so that the wheels are periodically released before a skid or a hydroplane action has had an opportunity to develop.

In the embodiment of FIG. 2 the invention is shown as applied to an air brake system such as that commonly used on trucks or other heavy vehicles. In this system the brake pedal 30 is connected to actuate an air valve 31 which is connected by a pipe 33 to control the supply of air under pressure from a reservoir 32. The valve 31 is connected to cylinders, not shown, mounted to control the pressure of the brakes on the various wheels. This portion of the system is conventional and only so much thereof has been shown as is necessary to an understanding of the invention.

A pressure line 35 is connected from the line 34 to a closed low pressure chamber 36 in a valve 40 having a diaphragm 41 separating the low pressure chamber 36 from a high pressure chamber 42. The diaphragm 41 is mounted between the two halves of the valve housing 43 together with a fixed perforated plate 44 which forms a stop to limit the deflection of the diaphragm toward the high pressure chamber 42.

The high pressure chamber is connected by a line 45 to a reservoir 46 containing air under a pressure higher than that in reservoir 32. The housing 43 has a vent port 47 closed by a ball 48 which is held in seated position by a spring 51. A solenoid housing 52 is attached to the valve housing 43 and carries a solenoid winding 53 actuating a plunger 54 which is normally held retracted by a spring 55 and which is adapted, when extended by energization of the solenoid winding 53 to engage and unseat the ball so as to vent the high pressure chamber 42 through a vent 56. The solenoid winding 53 is connected to the stop light circuit and to the timed pulsing circuit in a manner similar to the solenoid 20 of FIG. 1 so that the solenoid 53 is pulsed when the brake pedal is depressed.

The pulsing of the solenoid causes periodic and repeated unseating of the ball 48 and consequently a periodic venting of the high pressure chamber 42. When high pressure is supplied to this chamber the diaphragm 41 is deflected toward the low pressure side but when the ball 48 is unseated the pressure in the chamber 42 is reduced below that in the chamber 36 and the diaphragm 41 is flexed against the stop plate 44 by the air pressure in the chamber 36. This flexing of the diaphragm 41 varies the total volume on the brake lines and causes a corresponding fluctuation of the air pressure supplied to the brake cylinders. The braking force is thus alternately reduced and increased as in the system of FIG. 1.

It is to be noted that the low pressure chamber 36 remains closed at all times so that there can be no interference with the normal operation of the air brakes, even if the air supply to the high pressure side of the valve 40 should be interrupted. Under dry weather conditions when the pulsing system is not required it is not necessary to maintain the reservoir 46 under pressure.

What is claimed is:

1. In a fluid-actuated braking system for vehicles having fluid actuated wheel brakes, means including a fluid pressure line adapted to supply fluid pressure to said wheel brakes, a pressure source connected to supply fluid pressure to said line, a brake pedal connected to control the supply of pressure from said source for exerting braking pressure, pressure control means connected to reduce the fluid pressure in said line, solenoid actuated means connected to actuate said last means, and energizing circuit for said solenoid including a timer adapted to energize said solenoid in predetermined timed pulses, a switch connected to be actuated by said brake pedal, and connected in said solenoid circuit for energizing the same when said brake pedal is depressed, and a control switch in said circuit connected to interrupt the same for eliminating the pulsing effect.

2. A system as set forth in claim 1 in which means is provided to adjust the timing of said pulses.

3. A system as set forth in claim 1 in which said pressure source comprises a master cylinder, and said pressure control means comprises a second cylinder connected to control the hydraulic pressure in said master cylinder and said timer is connected to actuate said second cylinder cyclically.

4. A system as set forth in claim 1 in which said pressure source includes a pressure control valve having a high pressure chamber and a low pressure chamber, a high pressure source and a low pressure source connected to the respective chambers, means connecting said low pressure chamber to said line, a vent valve in said high pressure chamber, and means connecting said valve to be alternately opened and closed by said solenoid actuated means for thereby alternately pressurizing and venting said high pressure chamber, a flexible diaphragm separating said chambers and adopted to be flexed in response to the alternate pressurizing and venting of said high pressure chamber for thereby varying the volume of said low pressure chamber and the consequent fluid pressure in said line.

References Cited
UNITED STATES PATENTS 3,089,734 5/1963 Jankus _____ 303—61 X
3,231,315 1/1966 Turnbull _____ 303—61

DUANE A. REGER, *Primary Examiner.*